April 5, 1960 G. A. LONG, JR 2,931,913
RADIATION RECEIVER
Filed Jan. 2, 1953

INVENTOR
GEARY A. LONG, JR.
BY
ATTORNEYS

United States Patent Office 2,931,913
Patented Apr. 5, 1960

2,931,913

RADIATION RECEIVER

Geary A. Long, Jr., Arlington, Va.

Application January 2, 1953, Serial No. 329,487

6 Claims. (Cl. 250—209)

(Granted under Title 35, U.S. Code (1952), sec. 266)

This invention relates to a radiation receiver wherein radiation emitted by a body is received by the receiver and focused on a transducer which converts the radiation into electrical signals.

Old methods of accomplishing this functioned in one of the following ways:

(1) The field of view was scanned by moving or oscillating the receiver back and forth so that radiation from any object that is stationary or moving is caused to pass over the sensitive element or transducer and develop the electrical signal.

(2) The field of view was chopped by a slit or sector disc or shutter and by means of proper design of the physical optics or collection system the radiation from the discrete object is modulated as it falls on the transducer to develop the electrical signal. This system is also sensitive to objects which are not moving with respect to the receiver as well as those that are moving.

The disadvantages of the old systems were that the receiver could not distinguish between stationary and moving objects and that moving parts, with their accompanying problems of maintenance and installation, were required.

Accordingly, it is an object of this invention to provide an electrical signal from a device when a radiating body moves along the sensitive plane and in the field of view of the device.

It is a further object of the invention to provide a device which will transmit an electric signal when a moving object crosses its field of view without transmitting any signal toward the object.

It is a further object of this invention to provide a device without any moving parts which will convert radiations from a discreet object into electrical signals.

Another object of the invention is to provide a device which will distinguish between stationary and moving objects and also determine the direction of motion of moving objects.

These and other objects of the invention will be more fully comprehended when the following specification is read in conjunction with the accompanying drawings wherein.

Figure 1:
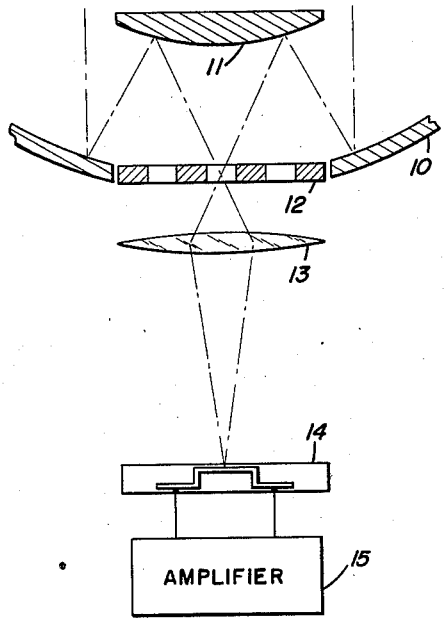
Fig. 1 is a schematic view of one form of the invention

In Fig. 1, 10 is a mirror of spherical or other desired configuration which collects radiations passing through a window in the housing (not shown) from a target which is crossing the field of view of the device. The rays are reflected back to a secondary reflector 11 which focuses them on an image plane which is crossed by a grid 12 of graded alternate bars of contrasting spectral transmission, i.e. the 1st, 3rd, 5th etc. bars transmit 100% or less of the radiation while the 2nd, 4th, 6th etc. transmit 0% or more of the radiation. The bars are parallel to each other and are normal to the plane of motion of the object to be detected. As the motion of the image passes the alternate bars the radiation on the far side is therefore modulated. The modulated radiation is collected by a field lens 13 so that the radiation which is allowed to pass through any part of the image area of the image plane will fall on the sensitive element or transducer 14 which converts the radiation to an electrical signal and transmits it to an amplifier 15 of conventional design. The transducer may take any convenient form such as a photo emissive cell, photo barrier layer cells, etc.

Figure 3:
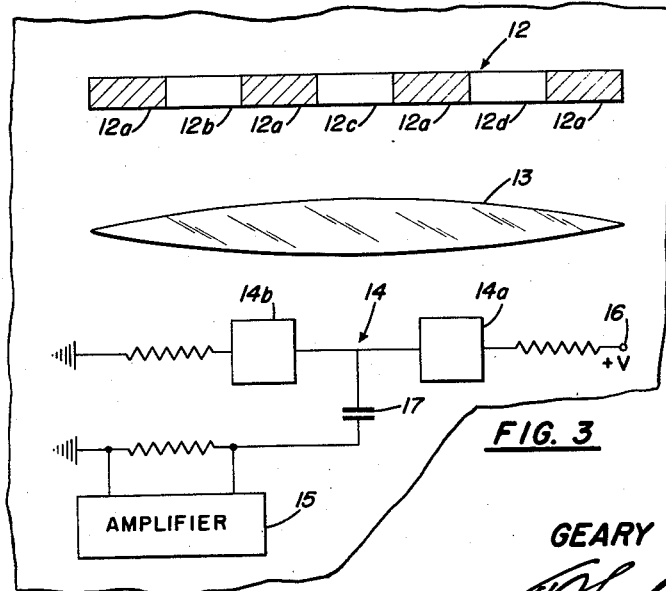
Fig. 3 is an enlarged and more detailed view of a portion of Fig. 1.

Looking now at Fig. 3 for a more detailed analysis of the operation of the device, assume there is a target above and to the extreme left of the grid 12 and that such target is moving to the right, i.e. in a clockwise direction. The electrical system is in a steady state condition with terminal 16 maintained at a constant voltage above ground by an external source not shown. The amplifier is transmitting a signal of constant amplitude. At this time the angle between the grid and target is so acute that none of the radiations from the latter are permitted to pass through the apertures 12b, 12c, 12d in the grid, i.e. the target is beyond the field of view of the device. As the target continues to move to the right it eventually enters the field of view. At the instant of entrance, the rays which pass through aperture or translucent bar 12b are focused by lens 13 upon the extreme right end of the transducer. It is obvious that opaque bars 12a do not permit passage of the rays which impinge upon them. The transducer is composed of two sensitive elements 14a and 14b which are connected in opposition and their midpoint is connected to the grid of the amplifier tube, not shown, via capacitance 17. When transducer element 14a is excited by the rays passing through translucent bar 12b and focused upon it by lens 13, the element generates a voltage which causes the bias on the amplifier tube to decrease and the amplitude of the signal transmitted by the amplifier increases. As the target continues to move to the right the focused rays traverse element 14a, pass off its left end and then impinge upon the extreme right end of transducer element 14b passing successively through opaque bars 12a and translucent bars 12b, 12c. When the radiations excite transducer element 14b it generates a voltage in opposition to that previously generated by element 14a. This causes the bias on the tube to increase and the amplitude of the signal transmitted thereby to decrease. As the target continues to move to the right the rays from translucent bars 12c and 12d traverse element 14b and eventually pass off its left end. It is obvious that if the target were travelling in the opposite direction, i.e. from right to left the cycle would be 180° out of phase with the cycle outlined above. It should be equally obvious from the above that the frequency of the waves or cycles is exclusively dependent upon the speed with which the target traverses the field of view. A comparison of the phase of the wave with some fixed reference and a measurement of its frequency will therefore determine the velocity vector of the target, i.e. its speed and direction.

While only a small number of alternately opaque and translucent bars 12a through 12d have been shown, as will be obvious, a large number of such bars may be required.

In the event that a stationary object is within the field of view of the device, some of the radiations emitted thereby will be focused on one or the other of the transducer elements 14a and 14b. This will cause the generation of a voltage which may aid or oppose the voltage generated by the external source. As a result an additional charge will be placed upon capacitance 17 or it will be caused to partially discharge. During this transient period of charge or discharge the bias on the tube will be changed and the amplitude of its signal will be greater or less than usual. However, when the capacitance reaches a steady state condition the bias on the tube will return to normal as will the signal transmitted thereby. From that point on, no signal due to the radiations from the stationary body will be transmitted by the amplifier.

In review, when a moving body crosses the field of view of the device, a signal of varying amplitude will be transmitted. The phase of the signal with respect to a datum will give the direction of motion of the object and the frequency of the signal will give the speed of the object. When a stationary object is present in the field of view of the device the amplitude of the amplifier output will temporarily become greater or less than its norm and will then return to an unvarying amplitude when the capacitance reaches its new steady state condition.

Figure 2:
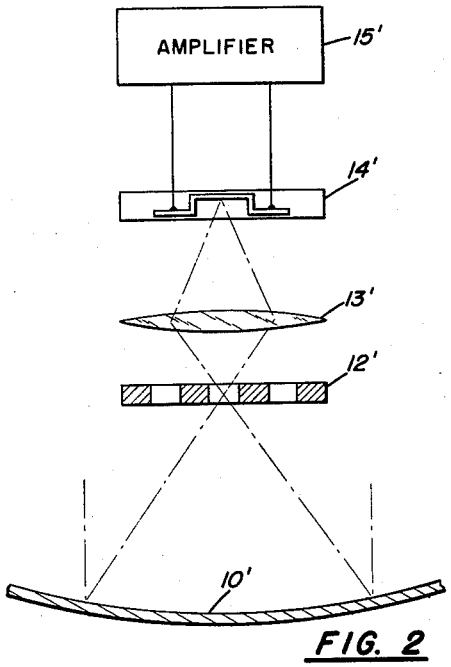
Fig. 2 is a schematic view of another form of the invention.

Figure 2 shows another arrangement of the elements of the invention. Here the mirror 10' focused the rays directly on the image plane where they are modulated by the grid 12' and then focused by the lens 13' on to the transducer 14'. The secondary reflector 11 of Figure 1 is dispensed with in this arrangement.

While two embodiments of the invention are disclosed above it is obvious that numerous other variations may be made therein without departing from the spirit of the invention. The above description should not therefore be considered as in any way limiting the scope of the invention as set forth in the appended claims.

The invention described herein may be manufactured and used by or for the Government of the United States of America for governmental purposes without the payment of any royalties thereon or therefor.

Having fully described my invention, what I claim as new is:

1. A radiation receiver for detecting the presence of a discrete object within the field of view of said receiver comprising means for collecting radiation emitted from said discrete object, single grid means positioned in operative relation to said collecting means having sections which are substantially translucent to radiation alternating with sections which are substantially opaque to radiation, focussing means for receiving the radiation passing through said translucent sections of said single grid means, transducing means comprising a plurality of transducer elements spaced from each other and positioned in operative relationship to said focussing means, said focussing means causing said radiation to successively impinge on said transducer elements to convert said radiant energy to electrical energy, the frequency of the impinging of the radiation on the transducer elements depending on the rate of movement of said discrete object relative to said single grid means whereby successive amounts of radiation are impinged on the transducing means, the frequency of the electrical energy produced by said transducing means being an indication of the speed of said discrete object, an output terminal, means connecting the transducer elements in electrical opposition to said output terminal for producing impulses at said terminal which have a relationship to each other indicative of the direction of movement of said discrete object, and amplifying means operatively coupled to said output terminal for amplifying the output of said transducing means.

2. A radiation receiver for detecting a discrete object moving within the field of view of said receiver comprising a single grid having sections which are substantially translucent to radiation alternating with sections which are substantially opaque to radiation, collimating means operatively positioned with respect to said single grid, said single grid in conjunction with said collimating means causing radiation emitted from said discrete moving object to intermittently impinge upon a point beyond said collimating means, and transducing means positioned at said point beyond said collimating means for converting said intermittent radiation into intermittent electrical impulses, the frequency of said intermittent electrical impulses being an indication of the rate of relative movement of the discrete moving object with respect to the radiation receiver, said transducing means comprising a plurality of spaced transducer elements each having a radiation sensitive surface lying substantially in a plane parallel to said grid and including said point, an output terminal, said transducer elements being connected in electrical opposition to said output terminal whereby the phase of the electrical impulses produced by said transducing means at said terminal indicates the direction of movement of said object.

3. A radiation receiver as set forth in claim 2 including amplifying means coupled to said terminal for amplifying the electrical impulses produced by said transducing means.

4. A radiation receiver for detecting radiation emanating from a discrete object comprising a single grid having sections which are substantially translucent to radiation alternating with sections which are opaque to radiation, means for collecting and focussing the received radiation upon said grid, transducing means for converting the received radiation into an electrical signal comprising a plurality of spaced transducer elements each having a radiation sensitive surface lying in a plane substantially parallel to said grid, means interposed between said grid and said plane for bringing to a focus in said plane the radiation which traverses said grid, an output terminal, means connecting said transducer elements in electrical opposition to said terminal whereby an electrical signal will appear at said terminal, the frequency and phase of which is determined by the velocity of said object, an amplifier, and means to couple said amplifier to said terminal.

5. The radiation receiver of claim 4 in which said collecting and focussing means comprises a first curved mirror having a concave surface orientatable towards said object.

6. The radiation receiver of claim 5 in which said collecting and focussing means further comprises a second curved mirror having a convex surface facing the concave surface of said first mirror and wherein said grid is located in a central aperture in said first mirror.

References Cited in the file of this patent

UNITED STATES PATENTS

| | | |
|---|---|---|
| 2,013,594 | Zworykin | Sept. 3, 1935 |
| 2,016,036 | FitzGerald | Oct. 1, 1935 |
| 2,198,725 | Smith | Apr. 30, 1940 |
| 2,413,349 | Hancock et al. | Dec. 31, 1946 |